United States Patent
Aspell et al.

[11] Patent Number: 5,620,495
[45] Date of Patent: Apr. 15, 1997

[54] FORMATION OF GRATINGS IN POLYMER-COATED OPTICAL FIBERS

[75] Inventors: Jennifer Aspell, Holmdel; Daryl Inniss, Hillsborough; Valerie J. Kuck, Upper Montclair; Mark A. Paczkowski, Green Township, Sussex County; Debra A. Simoff, South Plainfield, all of N.J.

[73] Assignee: Lucent Technologies Inc., Murray Hill, N.J.

[21] Appl. No.: 515,625

[22] Filed: Aug. 16, 1995

[51] Int. Cl.$^6$ ............................................. C03B 37/01
[52] U.S. Cl. ...................... 65/392; 65/30.11; 65/425; 430/290; 430/321; 430/961; 385/123; 385/124
[58] Field of Search ............................ 65/392, 425, 426, 65/30.11; 430/290, 321, 961; 385/123, 124

[56] References Cited

U.S. PATENT DOCUMENTS

| | | | |
|---|---|---|---|
| 4,486,213 | 12/1984 | Lentz | 65/30.11 |
| 4,725,110 | 2/1988 | Glenn et al. | 350/3.61 |
| 5,164,218 | 11/1992 | Hayakawa | 430/961 |
| 5,235,659 | 8/1993 | Atkins | 385/124 |
| 5,287,427 | 2/1994 | Atkins | 385/124 |
| 5,327,515 | 7/1994 | Anderson et al. | 385/123 |
| 5,478,371 | 12/1995 | Lemaire | 65/392 |
| 5,500,031 | 3/1996 | Atkins | 65/392 |
| 5,559,907 | 9/1996 | Inniss | 385/123 |

*Primary Examiner*—John Hoffmann
*Attorney, Agent, or Firm*—Glen E. Books

[57] ABSTRACT

Recognizing the rate-determining nature of the coating removal and recoating steps, applicants have demonstrated that with proper combination of low absorbing polymer, glass and low intensity radiation, UV-induced gratings can be side-written into polymer coated fibers without removing the polymer, thus permitting up the possibility of high speed fabrication of fiber gratings.

5 Claims, 1 Drawing Sheet

FORMATION OF GRATINGS IN POLYMER-COATED OPTICAL FIBERS

FIELD OF THE INVENTION

This invention relates to methods for forming gratings, such as Bragg gratings, in optical fibers and, in particular, to a method for forming photo-induced gratings in polymer-coated optical fibers without removing the polymer.

BACKGROUND OF THE INVENTION

The dominant method for writing photo-induced gratings in optical fibers is side-writing with ultraviolet (UV) light through the fiber cladding. An optical fiber having a photosensitive glass core and a surrounding cladding is exposed to ultraviolet light having an intensity which varies periodically along a length of the fiber. The periodically varying intensity pattern is typically provided by applying a UV beam to an optical phase grating as described in Anderson et al U.S. Pat. No. 5,327,515 issued Jul. 5, 1994 which is incorporated herein by reference. Alternatively, the intensity pattern can be provided by an amplitude mask or by interfering a pair of coherent UV beams as described in W. H. Glenn et al U.S. Pat. No. 4,725,110 issued Feb. 16, 1988, incorporated herein by reference. In each of these conventional techniques, the source of UV light is typically a high intensity Excimer laser.

Surprisingly, the rate-determining step in conventional fiber grating manufacture is not writing the grating but rather removing and subsequently reapplying the protective polymer coating that the fiber was provided at manufacture. These coatings are needed to protect the sensitive fiber from contamination and mechanical damage, but typical coatings significantly absorb UV radiation and interfere with grating formation. Moreover the coating would be damaged by UV laser beams. Thus, an initial step in conventional grating formation is striping the polymer coating, as by soaking the fiber in hot sulfuric acid. A new coating must be applied and cured after the grating is formed. The coating removal and reapplication steps consume more than half the time required to write a grating in the conventional process.

SUMMARY OF THE INVENTION

Recognizing the rate-determining nature of the coating removal and recoating steps, applicants have demonstrated that with proper combination of low absorbing polymer, glass and low intensity radiation, UV-induced gratings can be side-written into polymer coated fibers without removing the polymer, thus permitting high speed fabrication of fiber gratings.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1:
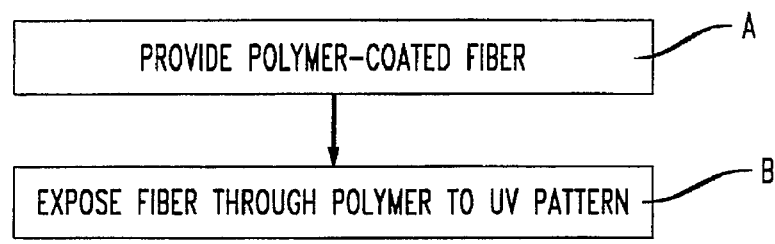
FIG. 1 is a flow diagram depicting the steps involved in forming a grating in polymer coated fiber.

Referring to the drawings, FIG. 1 is a flow diagram depicting the steps in forming a grating in polymer-coated fiber. The grating can be a Bragg grating or a long period grating. As shown in block A of FIG. 1, the first step is to provide an optical fiber waveguide having a polymer coating with low ultraviolet absorbtion polymer. The optical fiber, as is well known, comprises an inner core of relatively high refractive index and an outer cladding. The inner core is made of UV photosensitive glass, such as germanosilicate, so that a grating can be written by UV radiation. The outer polymer coating should be of low UV absorbing polymer such as an aliphatic poly(meth)acrylate, a silsesquioxane, a vinyl ether, or an alkyl substituted silicone.

Advantageously, the fiber is sensitized to UV radiation as by treating the fiber with deuterium $D_2$. This preferably involves placing the fiber in a $D_2$ gas environment, advantageously at an elevated pressure and temperature, so that $D_2$ will diffuse through the polymer, the cladding and into core. Typical treatment conditions are 3500 psi, 50°–70° C. for 3 days. The treatment enhances the sensitivity of the UV photosensitive core so that the grating can be written at lower intensity.

Figure 2:
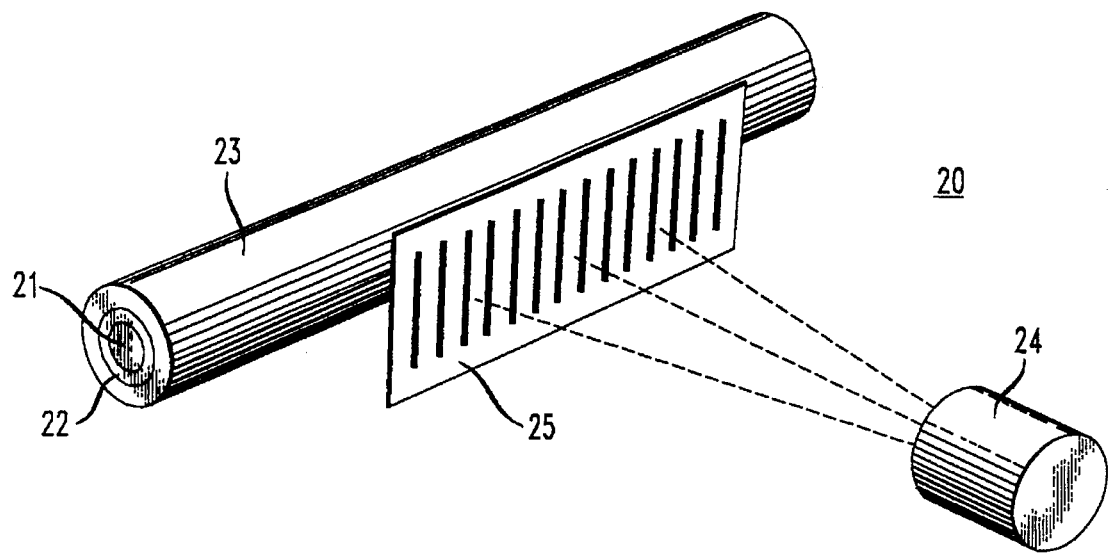
FIG. 2 is a schematic view in partial cross section showing the arrangement used in grating formation.

FIG. 2, which shows typical apparatus for practicing the method, includes a typical fiber 20 comprising a core 21, a cladding 22 surrounding the core, and an outer polymer coating 23.

Block B shows that the next step is to expose the fiber by side writing through the polymer and cladding, a pattern of UV radiation corresponding to the desired grating. Successive radiation intensity peaks are spaced apart by the desired grating spacing. The grating pattern can be defined by a mask along the fiber such as an amplitude mask or a phase mask schematically illustrated in FIG. 2. UV light from laser 24 passes through mask 25, the polymer coating 23, and the cladding 22 to write a pattern of index changes along the photosensitive core 21. Alternatively, the pattern can be defined by two interfering beams of UV radiation. The UV radiation should be at a sufficiently low intensity that it does not seriously damage the polymer coating.

Methods for forming gratings in polymer-coated fiber can be better understood by consideration of the following specific examples.

EXAMPLE 1

A methylsilsesquioxane-coated fiber treated with $D_2$ was exposed to UV light from a KrF excimer laser. An amplitude mask was used to produce long period gratings. The fiber was held taut next to the amplitude mask, and its side adjacent to the mask was exposed to the UV radiation. At 130 mJ/cm$^2$ 1 dB loss developed at the selected wavelength after exposure for approximately 5 minutes. Examination of the fiber surface showed some physical damage to the polymer with periodicity comparable to the amplitude mask, but the coating remained intact and the damage appeared superficial. Decreasing the power to 100 mJ/cm$^2$ resulted in 0.5 dB loss, and minor damage to the surface of the polymer.

EXAMPLE 2

In this example, using a similar methylsilsesquioxane coated fiber, UV laser pulses at 242 nm were obtained from a frequency-doubled dye laser (which was pumped by a KrF excimer laser). The radiation was defocused to decrease the fluence. In the first attempt, the focal point was moved 2 inches behind the fiber. After ~3 minutes of exposure at 20 mw there was no evidence of a grating impressed in the fiber core. In the second attempt, the focal point was moved to within 1 inch of the fiber. A weak reflector (~3%) was observed. In subsequent attempts a 10% reflector was grown in less than 1.5 minutes and an ~70% reflector was grown after 6 minutes of exposure. In none of these cases was damage to the polymer coating detected.

It is to be understood that the above-described embodiments are illustrative of only a few of the many possible specific embodiments of the invention. Numerous and varied other arrangements can be made by those skilled in the art without departing from the spirit and scope of the invention.

The invention claimed is:

1. A method of forming a grating in an optical fiber comprising the steps of:

providing a polymer-coated optical fiber, said fiber having a cladding and a photosensitive core;

without removing said polymer, exposing said core by side writing through said polymer and cladding, to a pattern of ultraviolet radiation corresponding to said grating.

2. The method of claim 1 wherein said polymer is selected from the group consisting of aliphatic polyacrylates, silesesquioxanes, alkyl-substituted silicones and vinyl ethers.

3. The method of claim 1 wherein said polymer is methylsilsesquioxane.

4. The method of claim 1 further comprising the step of loading $D_2$ into the core of said fiber prior to said exposure of said core.

5. The method of claim 1 wherein the polymer is polymethacrylate.

* * * * *

UNITED STATES PATENT AND TRADEMARK OFFICE
CERTIFICATE OF CORRECTION

PATENT NO. : 5,620,495

DATED : April 15, 1997

INVENTOR(S) : Jennifer Aspell, Daryl Inniss, Valerie J. Kuck,
Mark A. Paczkowski and Debra A. Simoff It is certified that error appears in the above-identified patent and that said Letters Patent is hereby corrected as shown below:

In the Absract, Line 6, "-permitting up-" should read --permitting--.
Column 1, Line 38 "-striping-" should read --stripping--.
Column 2, Line 8, "-absorbtion-" should read --absorption--.
Column 2, Line 14, "--a silesquioxane--" should read --silesquioxane--.
Column 2, Line 14, "-silesquioxane, a-" should read --silesquioxane,--.
Column 3, Line 2, "-mw-" should read --mW--.

Signed and Sealed this

Sixteenth Day of September, 1997

Attest:

BRUCE LEHMAN

Attesting Officer

Commissioner of Patents and Trademarks